(12) United States Patent
Chen et al.

(10) Patent No.: US 9,503,139 B2
(45) Date of Patent: Nov. 22, 2016

(54) VERY LOW INTERMEDIATE FREQUENCY (VLIF) RECEIVER AND METHOD OF CONTROLLING VLIF RECEIVER

(71) Applicant: MOTOROLA SOLUTIONS, INC., Schaumburg, IL (US)

(72) Inventors: Li Poh Chen, Pin (MY); Choong Foo Boon, Pulau Pinang (MY); Hun Weng Khoo, Penang (MY); Wai Kean Tham, Per (MY); Yew Leong Wong, Mel (MY); Wei-Gang Hu, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/909,645

(22) PCT Filed: Aug. 6, 2013

(86) PCT No.: PCT/CN2013/080923
§ 371 (c)(1),
(2) Date: Feb. 2, 2016

(87) PCT Pub. No.: WO2015/017986
PCT Pub. Date: Feb. 12, 2015

(65) Prior Publication Data
US 2016/0191089 A1    Jun. 30, 2016

(51) Int. Cl.
*H04B 1/10* (2006.01)
*H04W 72/04* (2009.01)
(52) U.S. Cl.
CPC ............ *H04B 1/109* (2013.01); *H04B 1/1036* (2013.01); *H04W 72/0406* (2013.01)

(58) Field of Classification Search
CPC ....... H04B 1/109; H04B 1/1027; H04B 1/10
USPC ....... 455/296, 311, 313, 283, 324, 208, 226, 455/422.1, 403, 73, 67.11, 67.13, 423–425, 455/426.1, 426.2; 375/316, 322, 324
See application file for complete search history.

(56) References Cited

U.S. PATENT DOCUMENTS

| 5,594,754 A | 1/1997 | Dohi et al. |
| 6,707,858 B1 | 3/2004 | Davie |
| 6,952,572 B2 | 10/2005 | Wong et al. |

(Continued)

FOREIGN PATENT DOCUMENTS

CN    101807943    8/2010

OTHER PUBLICATIONS

PCT/CN2013/080923 International Search Report and Written Opinion dated May 16, 2014 (11 pages).

*Primary Examiner* — Keith Ferguson
(74) *Attorney, Agent, or Firm* — Barbara R. Doutre

(57) ABSTRACT

A very-low intermediate frequency (VLIF) receiver and a method of controlling a VLIF receiver. The method comprises receiving a first signal, the first signal including a first adjacent channel interferer, and detecting first interference from the first adjacent channel interferer. The method further comprises, subsequent to receiving the first signal, receiving a second signal, the second signal including a second adjacent channel interferer, and detecting second interference from the second adjacent channel interferer. Furthermore, subsequent to detecting the second interference, the VLIF receiver is configured to avoid the first interference while receiving a third signal.

20 Claims, 6 Drawing Sheets

(56) References Cited

U.S. PATENT DOCUMENTS

| | | |
|---|---|---|
| 7,272,374 B2 | 9/2007 | Tuttle et al. |
| 7,805,113 B2 | 9/2010 | Gehring et al. |
| 7,822,385 B2 | 10/2010 | Lopez |
| 7,881,688 B1 | 2/2011 | He |
| 8,320,858 B2 | 11/2012 | Ruelke et al. |
| 2005/0180493 A1 | 8/2005 | Hooli et al. |
| 2007/0026831 A1 | 2/2007 | Jaffe et al. |
| 2007/0218851 A1 | 9/2007 | Soe et al. |
| 2008/0051053 A1 | 2/2008 | Fedan |
| 2009/0239489 A1* | 9/2009 | Kaczman ............... H04B 1/16 455/226.1 |
| 2009/0305643 A1 | 12/2009 | Sayers et al. |
| 2009/0323873 A1 | 12/2009 | Hunter et al. |
| 2012/0281569 A1 | 11/2012 | Yamamoto et al. |
| 2015/0295604 A1 | 10/2015 | Cheah et al. |

* cited by examiner

VERY LOW INTERMEDIATE FREQUENCY (VLIF) RECEIVER AND METHOD OF CONTROLLING VLIF RECEIVER

BACKGROUND OF THE INVENTION

Very Low Intermediate Frequency (VLIF) receivers are popular due to their relatively low cost and small size, as well as their ability to operate over a broad range of frequencies. A VLIF receiver combines a received radio frequency (RF) signal with a local oscillator prior to analogue to digital conversion. The local oscillator is set at a frequency close to that of the RF signal, but differing by an offset that is referred to as an intermediate frequency. For example, the intermediate frequency is typically between 3.6 kHz to 5.7 kHz, depending on-channel spacing.

The local oscillator thus operates at a frequency either just above or just below the frequency of the RF signal, i.e. on one "side" of the RF signal. At times, this results in interference from an adjacent channel interferer on the side of the RF signal where the local oscillator is operating.

The RF signal comprises an in-phase component, I, and a quadrature component, Q. Often during down-conversion, noise, distortion or imbalance is introduced into, or pronounced in, the I and Q components. I/Q imbalance algorithms exist that attempt to estimate amplitude and phase imbalances in the RF signal and compensate for the imbalances. However such algorithms work adequately only under certain conditions.

The local oscillator can be changed to the other side of the RF signal, to avoid interference with the adjacent channel interferer. However, switching the local oscillator during a call, for example, can cause bad user experiences or result in a dropped call. Furthermore, another adjacent channel interferer can be present on the other side of the RF signal, potentially resulting in more interference after changing the local oscillator.

A further problem with VLIF receivers of the prior art is that detecting interference and changing the local oscillator frequency based upon the detected interference is time consuming, which can in turn result in a negative user experience.

Yet a further problem with VLIF receivers of the prior art, is that they are prone to falsely detecting a carrier. This can cause the VLIF receiver to incorrectly change channel, and thus in turn cause a gap in received data.

Accordingly, there is a need for an improved VLIF receiver and a method of controlling a VLIF receiver.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
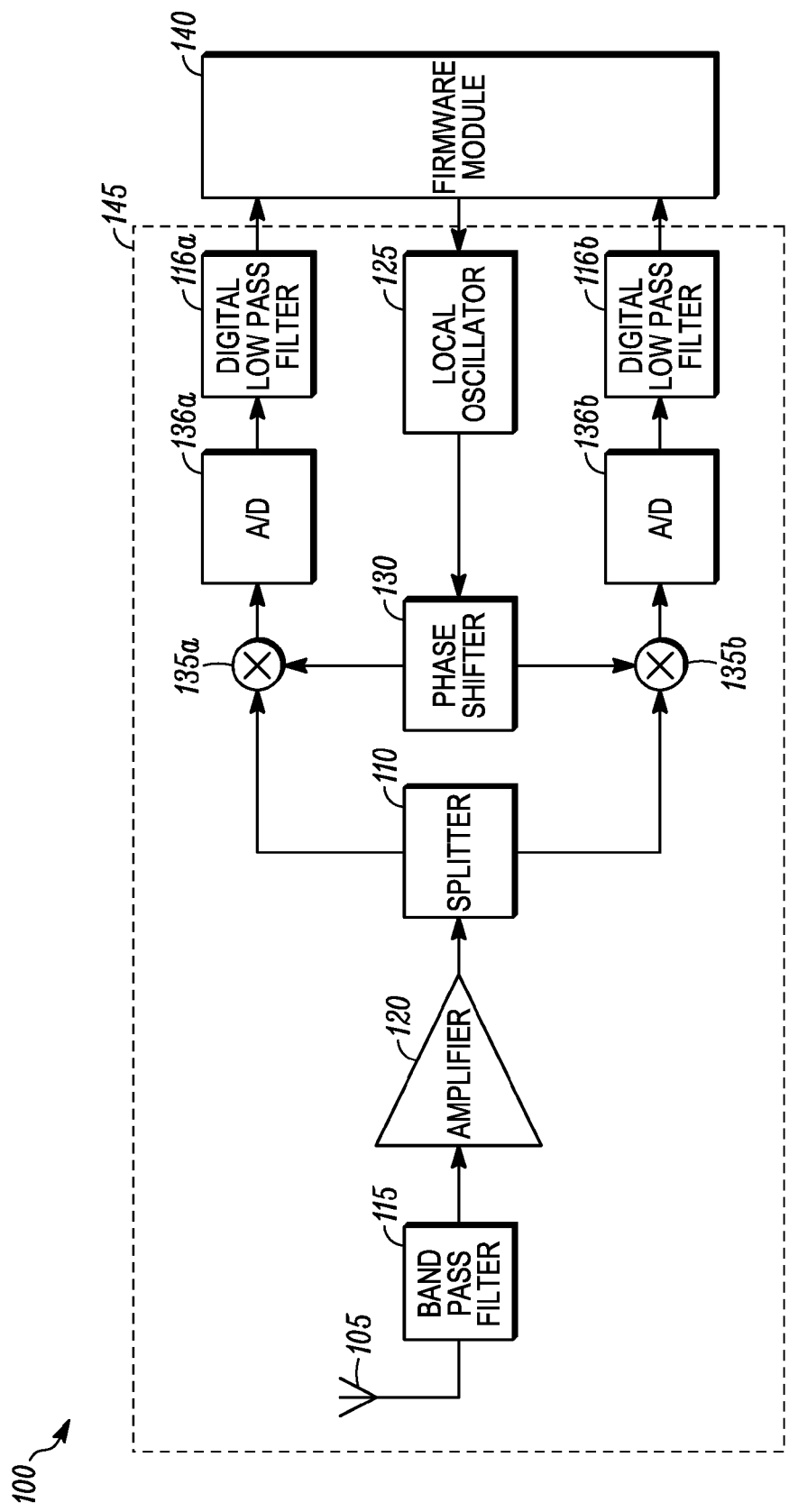
FIG. 1 is a block diagram of a Very Low Intermediate Frequency (VLIF) receiver in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to one aspect, the invention resides in a method of controlling a very low intermediate frequency (VLIF) receiver, the method comprising: receiving a first signal, the first signal including a first adjacent channel interferer portion; subsequent to receiving the first signal, detecting a first interference from the first adjacent channel interferer portion; receiving a second signal, the second signal including a second adjacent channel interferer portion; detecting a second interference from the second adjacent channel interferer portion; and subsequent to detecting the second interference, configuring the VLIF receiver to avoid the first interference while receiving a third signal.

FIG. 1 is a block diagram of a Very Low Intermediate Frequency (VLIF) receiver 100, according to an embodiment of the present invention.

The VLIF receiver 100 includes an antenna 105, for receiving a radio frequency (RF) signal, the antenna 105 coupled to a splitter 110 by a band pass filter 115 and an amplifier 120. The splitter 110 splits the signal into an in-phase path and a quadrature path, for extracting an in-phase component, I, and a quadrature component, Q, respectively.

The I and Q components are extracted using a local oscillator 125. The local oscillator 125 generates an reference signal, which is added to the in-phase and quadrature paths. The reference signal is at a frequency close to that of the RF signal, differing by an offset referred to as an intermediate frequency. The reference signal is phase shifted 90 degrees by a phase shifter 130 before being added to the quadrature path using a first mixer 135a, and added to the in-phase path without phase shift, i.e., shifted by 0 degrees, by a second mixer 135b. The I and Q components are digitized by analogue to digital converters 136a, 136b and then filtered by digital low pass filters 116a, 116b.

The filtered I and Q components, are then provided to a firmware module 140 for further processing.

The firmware module 140 includes a module for detecting interference from adjacent channel interferers and storing the interference in a channel interference table. As described further below, the channel interference table includes a frequency of the respective RF signal and details of a corresponding injection side of the local oscillator 125. This enables the VLIF receiver 100 to track interference over time, with respect to local oscillator settings and across channels, and thus make decisions based upon this previously detected interference.

According to certain embodiments, the firmware module periodically stores details of channel interference in the channel interference table. Alternatively, the firmware module stores details of channel interference in the channel interference table upon detection of interference.

The channel interference table advantageously comprises a first-in-first-out (FIFO) list of channel interference elements, such that old channel interference data is eventually overwritten by new channel interference data. The channel table is advantageously reset during a radio power cycle of the VLIF receiver 100.

The firmware module 140 further includes a module for detecting a radio mode change in the VLIF receiver 100, and a module for controlling the local oscillator 125 of the VLIF receiver 100. Detecting a radio change can comprise detecting a change in a receive operation of a receive mode controller of the VLIF receiver. Examples of a radio change on the VLIF receiver 100 that can be detected by the module for detecting a radio mode change include a channel change, a user initiated profile change, a change in battery saver mode, a transmit interrupt, a priority or conventional scan operation, or a push-to-talk (PTT) de-key.

According to certain embodiments, the firmware module 140 changes settings of the local oscillator 125 only when a radio change is detected, which prevents disruption of reception during normal operation.

By controlling the local oscillator 125 based upon data in the channel interference table, the firmware module 140 can reduce interference on a particular channel. This is performed by selecting a frequency of the local oscillator 125, such that it is on the "other side" of a signal than previously detected strong interferers.

In particular, for each channel, the local oscillator 125 can be set at a first frequency, which corresponds to a frequency of the desired signal minus a frequency offset, or a second frequency, which corresponds to the frequency of the desired signal plus the frequency offset. Thus the firmware module 140 can select between the first and second frequencies such that interference from an adjacent interferer is avoided or reduced.

Furthermore, when moving to a priority channel to do priority sampling, the VLIF receiver 100 can make use of the interferer information stored in the channel interference table to help determining the correct local oscillator frequency to use. As a result, false carrier detection on active non-priority channels can be avoided.

The antenna 105, splitter 110, band pass filter 115, amplifier 120, local oscillator 125, phase shifter 130, mixers 135a, 135b, analogue to digital converters 136a, 136b and digital low pass filters 116a, 116b are included in a hardware module 145 of the VLIF receiver 100. However, as discussed further below, several other hardware and firmware configurations can be used in the VLIF receiver 100.

Figure 2:
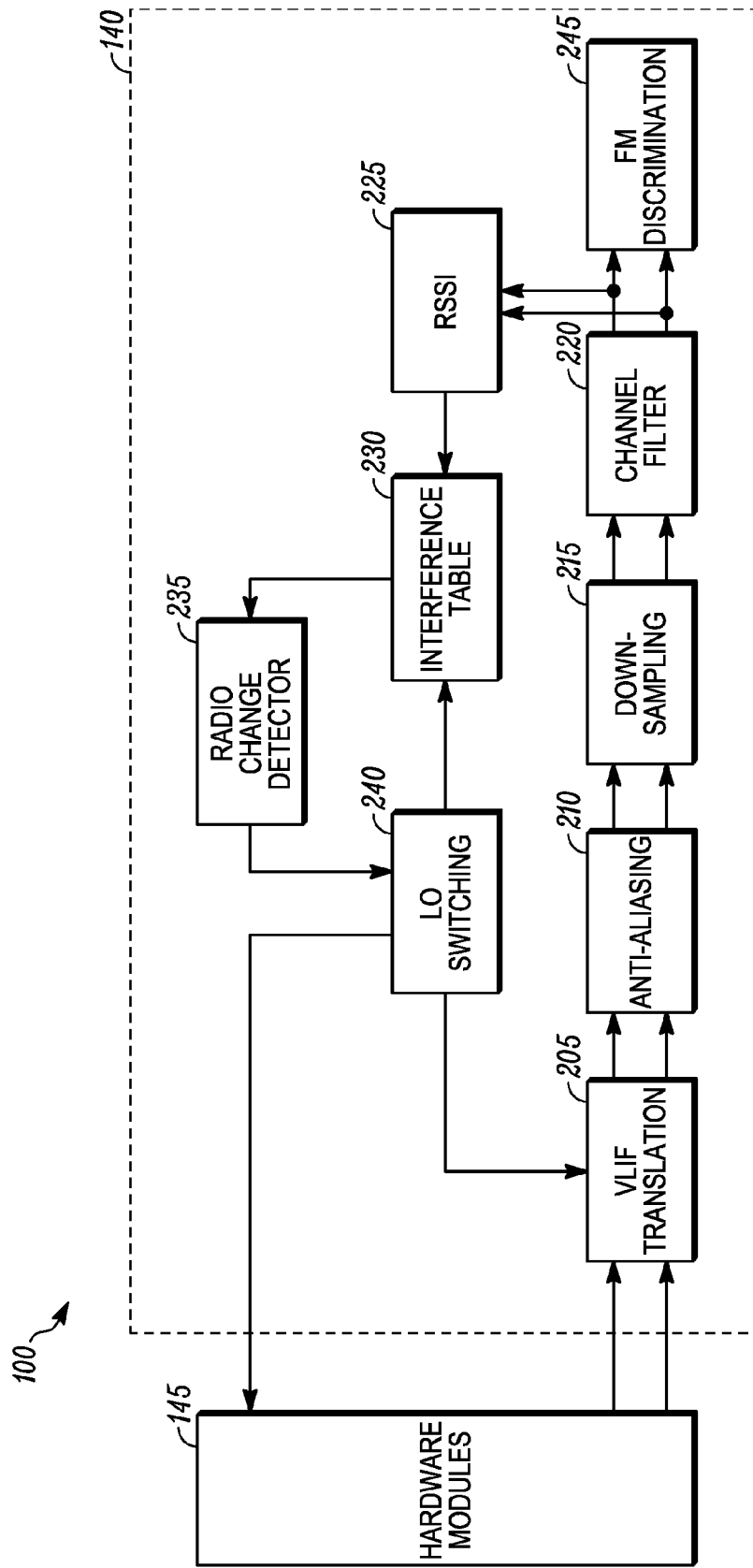
FIG. 2 is a block diagram of a firmware module of the VLIF receiver of FIG. 1, in accordance with some embodiments.

FIG. 2 illustrates the firmware module 140 of the VLIF receiver 100, according to an embodiment of the present invention. The firmware module 140 is coupled to the hardware module 145, as illustrated in FIG. 1.

The firmware module 140 includes a VLIF translation module 205, which receives the filtered I and Q elements from the mixers 135a, 135b and performs VLIF translation on the I and Q elements. The VLIF translated I and Q elements are then input into an anti-aliasing module 210, which performs anti-aliasing, followed by a down-sampling module 215, which performs down-sampling of the signal, and a channel filter 220, which provides a band pass filtration of the signal.

A Received Signal Strength Indication (RSSI) module 225 calculates a strength of the signal in the I and Q elements of the signal subsequent to VLIF translation, anti-aliasing, down sampling and channel filtering.

According to other embodiments (not shown), interference is detected using both a first RSSI calculation, performed prior to VLIF translation, and a second RSSI calculation, performed subsequent to channel filtration. A difference between the first RSSI calculation and the second RSSI calculation is then used to estimate a strength of the interferer.

As will be readily understood by the skilled artisan, any suitable signal strength or interference indication can be used, and can, for example, be based upon data prior to VLIF translation.

The signal strength, or measure of interference, is provided to interference module 230, which stores the data in an interference table, together with associated parameters. Each entry in the interference table advantageously comprises a channel interference element, the channel interference element including a frequency entry, describing a frequency of the VLIF receiver when the interference occurred, and an injection side entry, describing a side on which the local oscillator was operating when the interference occurred.

The channel interference element can additionally include a side-change flag, to indicate that a change in the local oscillator should be made for the frequency, and a counter, describing a number of local oscillator changes that can take place for the frequency.

When an interferer is detected and stored in the channel interference table, the side-change flag is typically set to true, indicating a local oscillator change should occur for the frequency and local oscillator settings. This enables the VLIF receiver to quickly determine if the local oscillator should be changed for the frequency by checking the side-change flag. The counter is advantageously set to a value of 2, so that no more than 1 complete cycle of switching is performed, i.e. switching back and forth between two local oscillator settings. The counter can thus prevent the local oscillator from switching back and forth when interference is present on both sides of the signal. However, as will be readily understood by a person of ordinary skill in the art, other counter values can be used, including dynamic counter values.

A radio change detector module 235 detects a change in radio in the VLIF receiver 100. Examples of changes in radio in the VLIF receiver include a channel change, a user initiated profile change, a change in battery saver mode, a transmit interrupt, a priority or conventional scan operation, or a push-to-talk (PTT) de-key. Based upon data from the interference module 230 and a detected change in the radio, the radio change detector module 235 can instruct a local oscillator switching module 240 to switch a frequency of the local oscillator 125, for example, to switch an injection side of the local oscillator, for example, from high side injection to low side injection or visa versa, as discussed in further detail below. By switching local oscillator settings during a change in radio of the VLIF receiver 100, disruption in data reception can be avoided.

Finally, the signal from the channel filter 220 is provided to a frequency modulation discrimination module 245 for demodulation of the signal.

Figure 3:
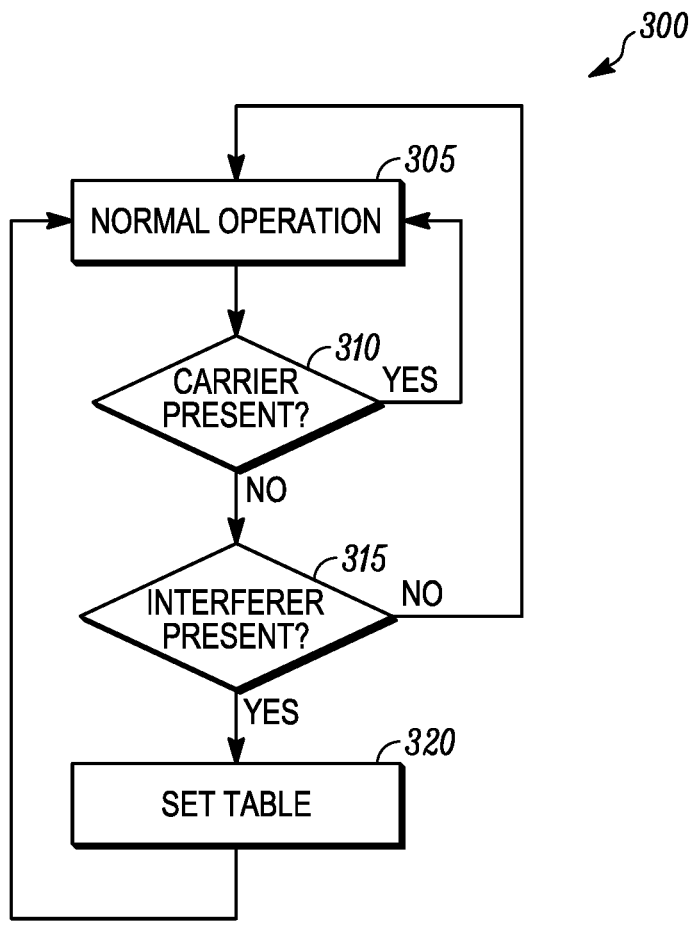
FIG. 3 illustrates a method of controlling a VLIF receiver in accordance with some embodiments.

FIG. 3 illustrates a method 300 of controlling a VLIF receiver, according to an embodiment of the present invention. The VLIF receiver can be similar to or identical to the VLIF receiver 100 of FIG. 1.

At block 305, the VLIF receiver receives a signal. The signal can, for example, comprise data of a data channel, or voice of a voice channel. Furthermore, the VLIF receiver can, for example, switch signals, pause reception of data, change channel, initiate a profile change, change to or from battery saver mode, or perform a priority or conventional scan operation, during block 305.

At block 310, it is determined if a carrier is present. Any one of several carrier detection algorithms well known in the art can be used to detect the presence of a carrier. The presence of a carrier here is an indication that channel quality is adequate and that no more than limited interference is present. If a carrier is determined to be present, the method continues in block 305.

If a carrier is not present, it is determined in block 315 if an interferer is present. In case an interferer is present, the signal typically comprises an on-channel portion and an adjacent channel interferer. An interferer can be detected using an RSSI, as discussed earlier, which can, for example, be performed either before VLIF translation, after VLIF translation, or both.

If no interferer is present, the method continues in block 305. In such case, interference need not be considered with a future configuration of, for example, the local oscillator.

If an interferer is present, details of the signal and/or interferer are saved in an interference table in block 320, together with associated parameters of the VLIF receiver. As discussed above, the interference table can comprise channel interference elements, each channel interference element including a frequency entry, describing a frequency of the VLIF receiver when the interference occurred, and an injection side entry, describing the side on which the local oscillator was operating when the interference occurred. Furthermore, the channel interference element can include a side change flag, to indicate that a change in the local oscillator should be made for the frequency, and a counter, describing a number of local oscillator changes that can take place for the frequency.

After saving details of the signal and/or interferer in the interference table in block 320, the method continues in block 305. Accordingly, the method blocks 305-320 described above are repeated, and thus details of first and second signals and/or first and second interferences are saved in the interferer table.

As will be readily understood by the skilled addressee, the method 300 can be easily modified to not consider detection of a carrier in described in block 310. In such case, the method 300 can continue at block 315 directly after block 305.

As discussed in further detail below, the VLIF receiver can be controlled based upon the data in the interference table. For example, the VLIF receiver can actively choose a local oscillator configuration when reconfiguring, such that it is likely to avoid interference based upon earlier recorded interference data.

Figure 4:
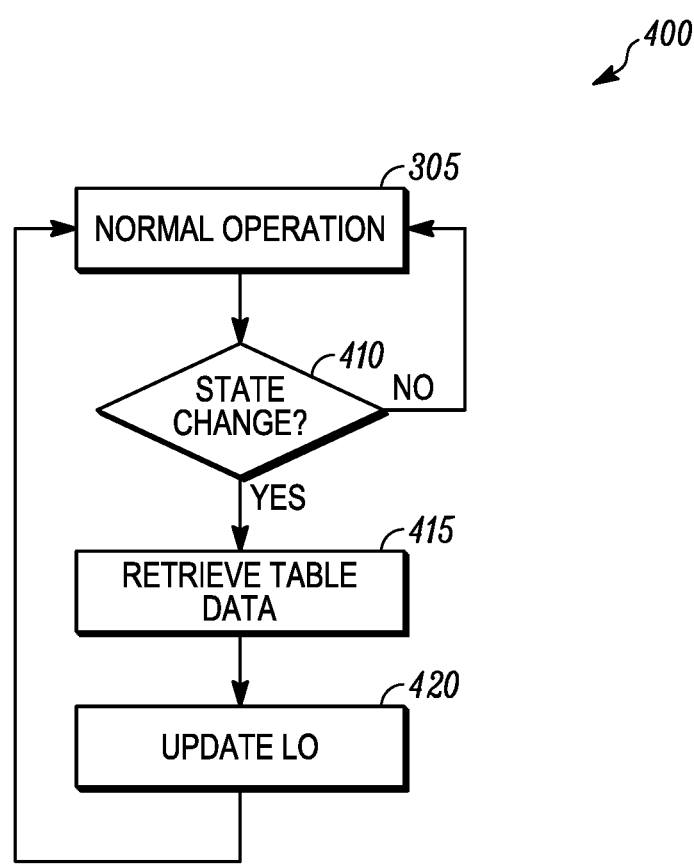
FIG. 4 illustrates a further method of controlling a VLIF receiver in accordance with some embodiments.

FIG. 4 illustrates a method 400 of controlling a VLIF receiver, according to an embodiment of the present invention.

At block 305, the VLIF receiver is receiving a signal, as described above. As discussed above, the signal can comprise data of a data channel, voice of a voice channel, or any other suitable data. Furthermore, the VLIF receiver can, for example, switch signals, pause reception of data, change channels, initiate a profile change, change to or from battery saver mode, or perform a priority or conventional scan operation, during block 305.

At block 410, it is determined if a state change has occurred in the VLIF receiver. Examples of state change include a channel change, a user initiated profile change, a change in battery saver mode, a transmit interrupt, a priority or conventional scan operation, or a push-to-talk (PTT) de-key.

If no state change has occurred, no action is taken and the method continues at block 305. This prevents disruption in radio reception caused by a change in receiver settings in the middle of, for example, a call. The skilled artisan will, however, appreciate that in certain circumstances it may be advantageous to disrupt a call temporarily to obtain better call quality long term.

If a state change has occurred, interference data is retrieved from an interference table in block 415. As discussed above, the interference table can comprise channel interference elements, each channel interference element including a frequency entry, describing a frequency of the VLIF receiver when the interference occurred, and an injection side entry, describing the side on which the local oscillator was operating when the interference occurred. Furthermore, the channel interference element can include a side-change flag, to indicate that a change in the local oscillator should be made for the frequency, for example, to change an injection side of the local oscillator, for example, from high side injection to low side injection or visa versa, and a counter, describing a number of local oscillator changes that can take place for the frequency.

In particular, data can be retrieved from the interference table based upon frequency. Thus, only interference data relating to the present frequency of the VLIF receiver need be considered when determining a configuration of the local oscillator.

In block 420, a local oscillator of the VLIF receiver is set based upon the data of the interference table. In particular, the local oscillator can be set to a value that is likely to reduce interference, given the information in the interference table. As discussed above, weights can be given to past interference values based upon age (e.g. when the corresponding signals were received) or strength of the corresponding signals, for example, and the VLIF receiver can select a local oscillator setting based upon these weights. Alternatively, the local oscillator can be set based upon a flag such as the side-change flag mentioned earlier.

The method 400 then returns to block 305. This enables the VLIF receiver to update the local oscillator each time a state change is detected in the VLIF receiver, which in turn enables the VLIF receiver to update its local oscillator configuration without disrupting reception of data on the VLIF receiver.

Figure 5:
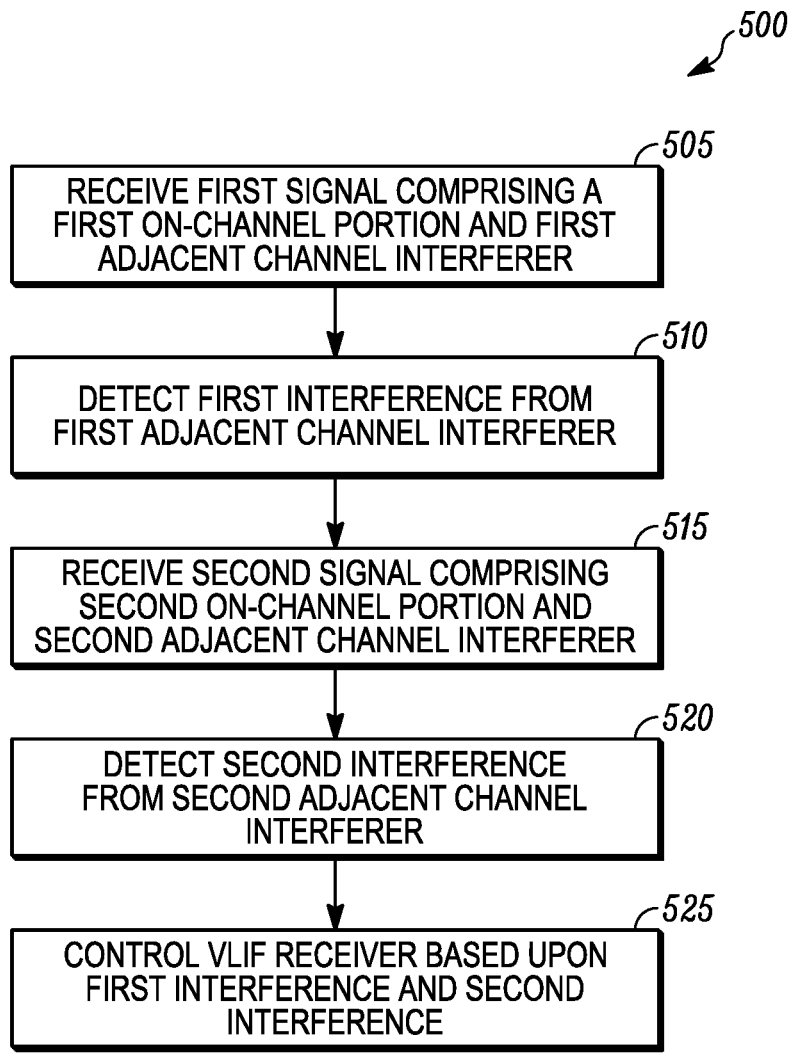
FIG. 5 illustrates yet a further method of controlling a VLIF receiver in accordance with some embodiments.

FIG. 5 illustrates a method 500 of controlling a VLIF receiver, according to an embodiment of the present invention.

At block 505, a first signal is received, the first signal comprising a first on-channel portion and a first adjacent channel interferer. The first signal, and in particular the first on-channel portion, can, for example, comprise a signal of a voice call. As discussed above, according to alternative embodiments the first signal does not include an on-channel portion.

At block 510, first interference is detected from the first adjacent channel interferer. As discussed above, any suitable measure of interference can be used, including an RSSI measurement of the signal. Furthermore, the first interference can, for example, be detected before VLIF translation or after channel filtration.

At block 515, a second signal is received, the second signal comprising a second on-channel portion and a second adjacent channel interferer. The second signal, and in particular the second on-channel portion, can, for example, comprise a further signal of the voice call mentioned above in block 505, or a signal of a different configuration of the VLIF receiver, such as reception of non-voice call related data. As discussed above, according to alternative embodiments the second signal does not include an on-channel portion.

At block 520, second interference is detected from the second adjacent channel interferer. The second interference is advantageously calculated using the same method as used in block 510. This enables the first and second interference to be easily compared.

At block 525, the VLIF receiver is configured based upon the first interference and the second interference and a third signal is received. This enables the VLIF receiver to consider previously measured interference when making a decision as to how to configure, for example, the local oscillator, for example, to switch an injection side of the local oscillator, such as from high side injection to low side injection or visa versa. As an illustrative example, the VLIF receiver can consider the first interference and the second interference by applying a weighting factor to each of the interferences based upon, for example, a frequency of the interference or an age of the interference, and then choose a configuration that is least likely to be impacted by the known interferences. In particular, frequencies differing from the current frequency of the VLIF receiver can be given zero weight, and old interference can be given a low weight, whereas recent interference at the current operating frequency can be given a high weight when controlling the receiver.

As discussed above, the decision to switch the local oscillator, or otherwise control the VLIF receiver, can be made upon detection of interference, whereas the actual act of switching of the local oscillator occurs at a later time to minimize interruption in the VLIF receiver.

Figure 6:
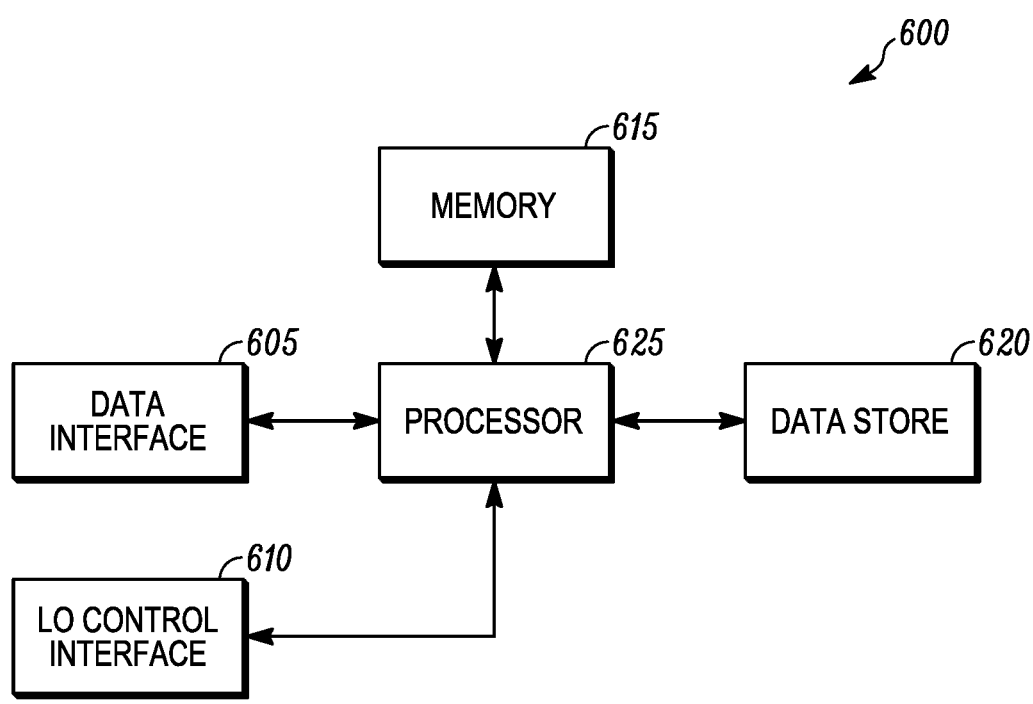
FIG. 6 a processing module of a VLIF receiver in accordance with some embodiments.

FIG. 6 illustrates a processing module 600 of a VLIF receiver, according to an embodiment of the present invention. As discussed above, the hardware and firmware distinction described above with reference to FIG. 1 and FIG. 2 is an illustrative example of a VLIF receiver implementation. Other examples include a digital signal processor (DSP) and software implemented using a hardware abstraction layer (HAL) interfacing with the DSP. In such case, the software can be stored on, and executed using the processing module 600.

The processing module 600 includes a data interface 605, a local oscillator (LO) control interface 610, a memory 615, a data store 620, and a processor 625 coupled to the data interface 605, local oscillator control interface 610, memory 615, and data store 620.

The data interface 605 provides an interface to the in-phase (I) and quadrature (Q) signals of the VLIF receiver 100. The processor 625 is then able to process the digital I and Q signals, and can, for example, apply I/Q imbalance correction.

The LO control interface 610 provides an interface to the local oscillator of the VLIF receiver 100. The LO control interface 610 can, for example, comprise a voltage output, which when provided to the local oscillator 125 determines a frequency at which the local oscillator 125 will operate.

The processor 625 processes computer readable program code components stored in the memory 615 and implements various methods and functions of the VLIF receiver 100 as described herein. Examples of functions include selecting a local oscillator frequency during a detected change in radio.

The data store 620 includes data, such as interference data, thresholds, filter tap data, or any other persistent or dynamic data. As will be understood by a person skilled in the art, a single memory, such as the memory 615, can be used to store both dynamic and static data.

The processing module 600 can include a system bus (not shown) that couples various system components, including coupling the memory 615 to the processor 625. The system bus can be any of several types of bus structures including a memory bus or memory controller, a peripheral bus, and a local bus using any of a variety of bus architectures.

The processor 625 and memory 615 can be replaced by dedicated hardware, and the processing module 600 can include software, hardware, firmware, or any combination thereof.

The structure of system memory 615 is well known to those skilled in the art and can include a basic input/output system (BIOS) stored in a read only memory (ROM) and one or more program modules such as operating systems, application programs and program data stored in random access memory (RAM).

Synchronization between hardware and the processing module 600 can be achieved by using a status word in memory. When the local oscillator is configured, the status word can be updated to reflect the new configuration. Similarly, if the hardware module detects a change in the status word, it can update the local oscillator parameters accordingly.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of controlling a very low intermediate frequency (VLIF) receiver, the method comprising:
receiving a first signal, the first signal including a first adjacent channel interferer portion;
detecting a first interference from the first adjacent channel interferer portion;
subsequent to receiving the first signal, receiving a second signal, the second signal including an adjacent channel interferer portion;
detecting a second interference from the second adjacent channel interferer portion; and
subsequent to detecting the second interference, configuring the VLIF receiver to avoid the first interference while receiving a third signal.

2. The method of claim 1, wherein the first signal further includes a first on-channel portion and the second signal further includes a second on-channel portion.

3. The method of claim 1, further comprising:
applying a first reference signal at a first reference signal frequency to the first signal to translate the first signal from a first carrier frequency to a translated frequency; and
applying a second reference signal at a second reference signal frequency to the second signal to translate the second signal from a second carrier frequency to the translated frequency.

4. The method of claim 3, wherein applying the first reference signal comprises programming a local oscillator to generate the first reference signal, and wherein applying the second reference signal comprises programming the local oscillator to generate the second reference signal.

5. The method of claim 3, wherein configuring the VLIF receiver to avoid the first interference comprises applying a third reference signal at a third reference signal frequency to the third signal to translate the third signal from the first carrier frequency to the translated frequency;
wherein one of the first reference signal frequency and the third reference signal frequency is positively offset from the first carrier frequency by a frequency offset and the other of the first reference signal frequency and the third reference signal frequency is negatively offset from the first carrier frequency by the frequency offset.

6. The method of claim 1, wherein the first and third signals are translated from a first carrier frequency, and the second signal is translated from a second carrier frequency, wherein the second carrier frequency is different from the first carrier frequency.

7. The method of claim 1, wherein the first, second and third signals are translated from a first carrier frequency.

8. The method of claim 7, further comprising: determining that the first interference should be avoided more than the second interference.

9. The method of claim 7, wherein determining that the first interference should be avoided more than the second interference is at least in part according to one or more of: times the first and second signals were received; and strengths of the first and second interferences.

10. The method of claim 1, further comprising:
detecting a radio mode change in the VLIF receiver;
wherein the VLIF receiver is configured to avoid the first interference upon detecting the radio mode change in the VLIF receiver.

11. The method of claim 10, wherein detecting the radio mode change comprises detecting a change in a receive operation of a receive mode controller of the VLIF receiver.

12. The method of claim 10, wherein the radio mode change comprises one of: a channel change, a user initiated profile change, a change in battery saver mode, a transmit interrupt, a priority or conventional scan operation, or a push-to-talk (PTT) de-key.

13. The method of claim 1, further comprising:
  storing details of the first interference in a channel interference table; and
  storing details of the second interference in the channel interference table;
  wherein the VLIF receiver is configured to avoid the first interference according to interference data in the channel interference table.

14. The method of claim 13, wherein storing details in the channel interference table comprises storing details of a carrier frequency of a signal; and storing details of a corresponding injection side of a local oscillator of the VLIF receiver.

15. The method of claim 13, further comprising periodically storing details of channel interference in the channel interference table.

16. The method of claim 13, wherein the channel interference table comprises a first-in-first-out (FIFO) list of channel interference elements.

17. The method of claim 13, wherein the channel interference table further comprises data indicating how many times the VLIF receiver can be reconfigured for a particular frequency.

18. A very low intermediate frequency (VLIF) receiver comprising:
  an antenna;
  a processor coupled to the antenna; and
  a memory coupled to the processor, the memory including instruction code executable by the processor for:
    receiving a first signal by the antenna, the first signal including a first adjacent channel interferer portion;
    detecting a first interference from the first adjacent channel interferer portion;
    receiving a second signal by the antenna, the second signal including a second adjacent channel interferer portion;
    detecting a second interference from the second adjacent channel interferer portion; and
    subsequent to detecting the second interference, configuring the VLIF receiver to avoid the first interference while receiving a third signal.

19. A VLIF receiver according to claim 18, further comprising:
  a local oscillator;
  wherein configuring the VLIF receiver comprises setting a frequency of the local oscillator.

20. A very low intermediate frequency (VLIF) receiver according to claim 18, further comprising:
  a data store;
  wherein the memory further includes instruction code executable by the processor for:
    storing details of the first interference on the data store; and
    storing details of the second interference on the data store.

* * * * *